United States Patent [19]

McDonner

[11] Patent Number: 5,066,146

[45] Date of Patent: Nov. 19, 1991

[54] BEARING ASSEMBLY FOR LAWN MOWER CUTTING BLADE

[75] Inventor: Orville R. McDonner, Conyers, Ga.

[73] Assignee: Fuqua Industries, Inc., McDonough, Ga.

[21] Appl. No.: 575,485

[22] Filed: Aug. 30, 1990

[51] Int. Cl.⁵ .............................................. F16C 33/66
[52] U.S. Cl. .................... 384/473; 56/17.5; 384/474
[58] Field of Search .................. 56/17.5, 16.7, 255; 384/462, 473, 474, 475

[56] References Cited

U.S. PATENT DOCUMENTS

| 2,641,517 | 6/1953 | Meadows | 384/473 |
| 3,875,728 | 4/1975 | Bacon | 56/17.5 |
| 3,897,678 | 8/1975 | Zurek et al. | 56/17.5 X |
| 3,967,438 | 7/1976 | Tombers | 56/17.5 X |

FOREIGN PATENT DOCUMENTS 853180  11/1960  United Kingdom ............... 384/473

Primary Examiner—Thomas R. Hannon
Attorney, Agent, or Firm—Jones Askew & Lunsford

[57] ABSTRACT

A bearing assembly housing having at least one pair of spaced-apart bearing races surrounding a heavy duty drive shaft of a commercial lawn mower is provided with a critically located single grease fitting for introducing a lubricant to the housing to thereby allow the lubricant to enter at the top of the upper bearing race and migrate by force of gravity to the lowermost bearing race, thereby insuring sufficient lubrication of all the bearings in the housing.

18 Claims, 2 Drawing Sheets

BEARING ASSEMBLY FOR LAWN MOWER CUTTING BLADE

BACKGROUND OF THE INVENTION

Commercial lawn mowers that are put to use on a daily basis for lawn maintenance of large tracks of land require continuous servicing in order to perform efficiently. Unlike the conventional home-owner type of lawn mower which requires relatively little servicing, the commercial machine must be lubricated periodically in order for its working parts to function normally, particularly the shaft and bearing assemblies associated with the cutting blades. Such bearing assemblies involve more than one race of bearings, often times two or more races in a spaced apart relationship in order to adequately support and bear the heavy duty drive shaft of the commercial lawn mower. In the past, however, it has been a problem to insure that such bearing assemblies are adequately lubricated, so that all the bearings in the spaced apart races are sufficiently and effectively greased for any given bearing assembly housing.

SUMMARY AND OBJECTS OF THE INVENTION

In order to overcome the aforementioned problem in the art of bearing lubrication for commercial lawn mowers, the present invention has for its primary purpose and main objective the provision of a simple and cost-efficient lubricating system that will insure that all the bearings in the separate and spaced-apart bearing races in a given bearing assembly housing will be sufficiently greased upon a single application of lubricant.

It is another object of the invention to provide a single grease fitting for the introduction of a lubricant into a bearing assembly housing of a commercial lawn mower having more than one bearing race and in which the lubricant is caused to grease all the bearings in the bearing housing and not just a portion of the bearings.

It is yet another object of the invention to provide a single grease fitting for a bearing assembly housing for a commercial lawn mower which is readily accessible for easy maintenance and at the same time affords the introduction of a lubricant to all the bearings in the housing.

In accordance with one embodiment of the invention a bearing assembly housing is seen to have at least one pair of spaced-apart bearing races that surround a heavy duty drive shaft of a commercial lawn mower. A single grease fitting for introducing a lubricant to the housing is critically located in the upper area of the housing so that the grease will lubricate the upper races and will flow down to lubricate the lower race.

The invention will be better understood and further objects and advantages thereof will become more apparent from the ensuing detailed description of the preferred embodiments taking in conjunction with the drawings.

DETAILED DESCRIPTION

Figure 1:
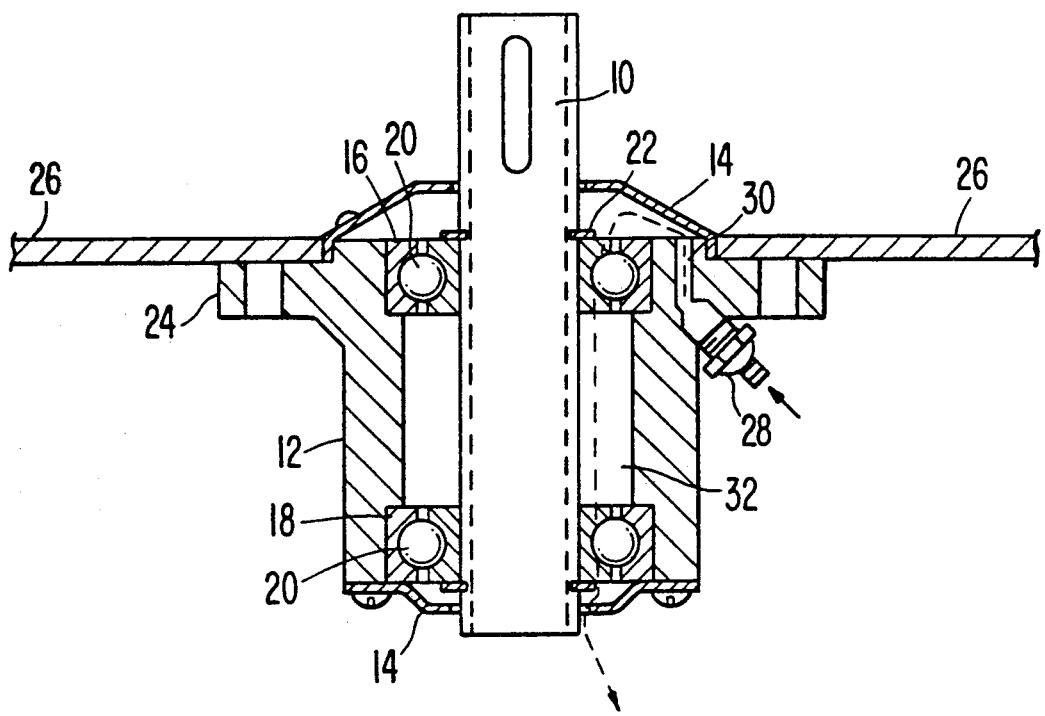
FIG. 1 is schematic elevational view of an embodiment according to the invention.
Figure 3:
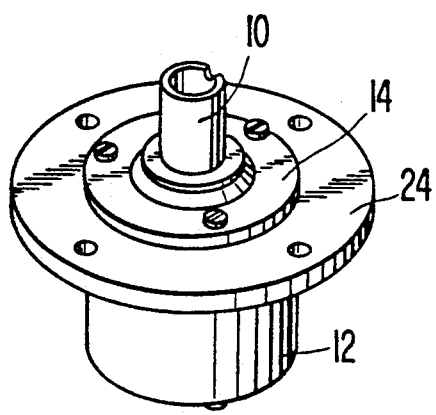
FIG. 3 is a schematic perspective of the assembled housing shown in FIG. 4.

Referring now to FIGS. 1 and 3, there is shown a heavy duty drive shaft 10 for driving one or more lawn mower blades (not shown). The drive shaft is seen to extend through a bearing assembly housing 12 having end caps or seal members 14 disposed at each end thereof by suitable screw means. Within the housing 12 and spaced apart from each other on the drive shaft 10 are a pair of ball bearing races 16 and 18, each race shown to have the requisite number of bearings 20 therein. Each of the ball bearing races 16 and 18 are of a suitably conventional design and are readily available as an off-the-shelf item. While two sets of bearing races are shown, it is to be understood that more than two could be disposed along the drive shaft in a spaced-apart relationship and contained within a suitably elongated bearing assembly housing.

The ball bearing races 16 and 18 are shown to held in place by suitable snap rings 22, and the outer periphery of each race is shown to be contained in a suitable ledge provided on the inner wall of the housing 12. An outer flange 24 is shown extending around the outer wall of the housing 12 and is provided with suitable holes for attachment to the lawn mower blade housing 26. In accordance with the invention a grease or lubricant fitting 28 of a suitably conventional design is provided just under the flange 26 and is angled upwardly to thereby provide ingress to a lubricant passageway 30 in a wall portion of the housing that runs parallel with the outer face of the upper bearing race 16 and communicates with the space above the bearing race adjacent the seal 14. Further, the housing 12 is seen to have an annular passageway 32 surrounding the drive shaft 10 and extending between the upper bearing race 16 and the lower bearing race 18. In operation the grease or lubricant is applied to the fitting 28 in the usual manner so that the grease is introduced into the passageway 30. The lubricant will migrate, upon its continued application, into the area above the upper bearing race 16 and eventually squeeze past the ball bearings themselves and by force of gravity and/or pressure drop down through the passageway 32 to the bearing race 18 below, as shown by the arrow. It will be seen, then, that continued application of a lubricant to the grease fitting 28 will insure that all the bearings in the two races 16 and 18 will completely and effectively greased, not only during the greasing operation itself but subsequent to it when the lawn mower is in use, since gravity will always be at work to cause the lubricant to pass from the upper area above the upper bearing race 16 to the lower bearing race 18.

Figure 2:
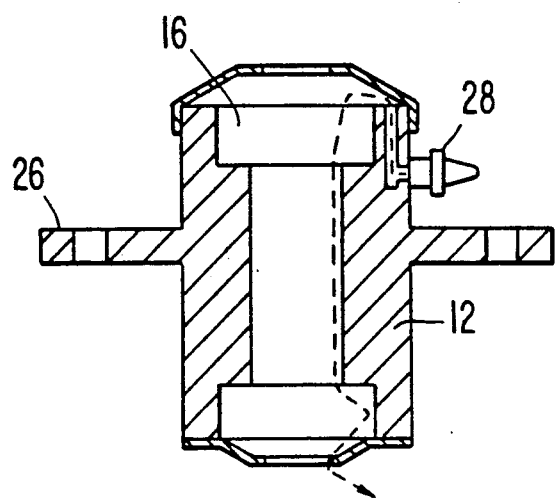
FIG. 2 is a schematic elevational view of another embodiment of the invention.

In FIG. 2 is shown a another modification in which the fitting 28 is disposed at right angles to the long axis of the bearing assembly housing 12. In this embodiment the flange 24 is shown to be below the fitting 28, and when attached to the lawn mower blade housing, will allow access to the fitting above the housing rather than from below it, as shown in FIG. 1.

Figure 4:
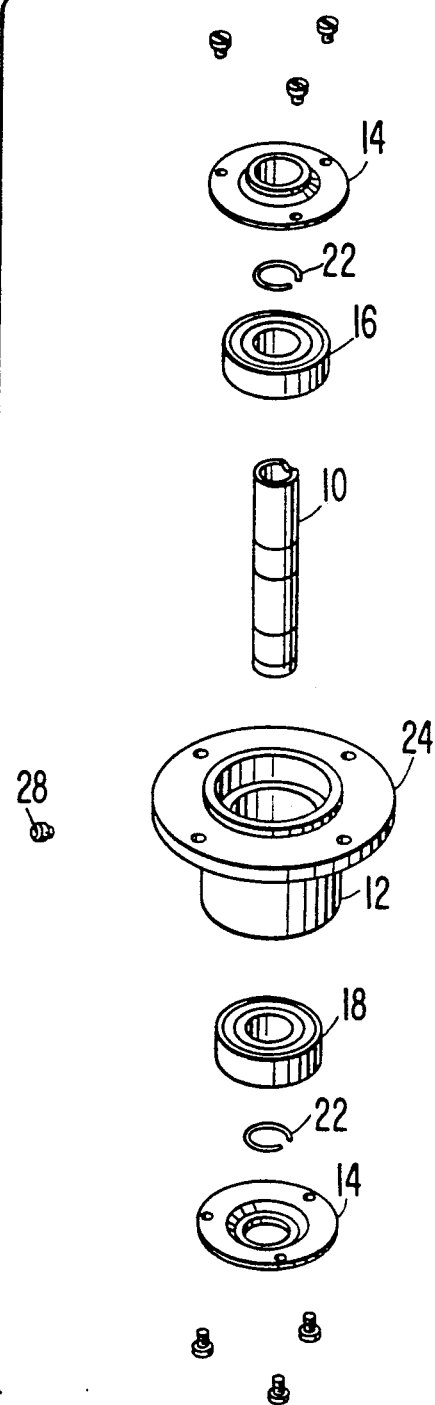
FIG. 4 is an explosive schematic of the embodiment shown in FIG. 1.

FIG. 3 shows the bearing assembly housing of FIGS. 1 and 4 completely assembled with the shaft 10 disposed along the long axis of the housing 12 and surrounded by the flange 24. The upper seal 14 is also shown suitably affixed to the housing by a conventional screw means.

The foregoing relates to a preferred exemplary embodiment of the present invention, it being understood that other embodiments and variants thereof are possible within the scope of the invention, the latter being defined by the appended claims.

What is claimed and desired to be secured by Letters Patent of the United States is:

1. A bearing assembly for a lawn mower drive shaft having its axis vertically oriented, comprising
   an upper and a lower bearing race means disposed in a spaced-apart relationship on said drive shaft,
   a bearing assembly housing surrounding said upper and lower bearing race means and having means defining a chamber above the upper bearing race means, and
   means for introducing a lubricant into said chamber above said upper bearing race means, whereby said lubricant is caused to lubricate said upper bearing race means and subsequently to migrate to said lower bearing race means.

2. A bearing assembly according to claim 1, wherein said housing is provided with a flange means for attachment thereof to a cutter blade housing for said lawn mower.

3. A bearing assembly according to claim 2, wherein said means for introducing a lubricant is disposed at and angle with respect to the long axis of said housing.

4. A bearing assembly according to claim 2, wherein said means for introducing a lubricant is disposed above said flange means.

5. A bearing assembly means according to claim 2, wherein said means for introducing a lubricant is disposed below said flange means.

6. A bearing assembly according to claim 1, wherein there is further provided a passageway means in said housing adjacent said upper bearing race means and communicating with said chamber, whereby said lubricant introduced by said lubricant introduction means contacts the top of said upper bearing race means.

7. The bearing assembly defined in claim 6 wherein said housing is provided with a flange means for attachment thereof to a cutter blade housing for said lawn mower, and said means for introducing lubricant is disposed above said flange means.

8. The bearing assembly defined in claim 6 wherein said housing is provided with a flange means for attachment thereof to a cutter blade housing for said lawn mower and said means for introducing lubricant is disposed below said flange means.

9. The bearing assembly defined in claim 6 wherein said housing is spaced from the shaft to provide an axial passage between the upper and lower bearing race means along which the lubricant will flow from the upper to the lower bearing race means, said housing having upper and lower recesses receiving said upper and lower bearing race means.

10. A bearing assembly according to claim 1 wherein said means for introducing said lubricant is disposed at right angles to the long axis to said housing.

11. A bearing assembly according to claim 1, wherein there is further provided a passageway means in said housing between said upper bearing race means and said lower bearing race means for allowing said lubricant to flow therebetween.

12. The bearing assembly defined in claim 11 wherein said means defining a chamber above the upper bearing race means includes a sealing member disposed about the shaft and secured to said housing and wherein there is further included a sealing member located about said shaft below said lower bearing race means and secured to said housing and wherein said housing is spaced from the shaft to provide said passage way means.

13. The bearing assembly defined in claim 12 further including a passage in the housing communicating with said chamber for introducing lubricant in said chamber.

14. In a lawn mower having a vertical drive shaft for a cutting blade mounted in a blade housing, a bearing assembly for the drive shaft, comprising
   an upper and a lower bearing race means disposed in a spaced-apart relationship on said drive shaft,
   a bearing assembly housing surrounding said upper and lower bearing race means,
   a flange means on said bearing assembly housing attached to said cutting blade housing,
   means for introducing a lubricant into said bearing assembly housing disposed adjacent said upper bearing race means,
   a first passageway means disposed in a wall of said bearing assembly housing adjacent said upper bearing race means and connecting said introduction means,
   a second passageway means in said bearing assembly housing between said upper bearing race means and said lower bearing race means for allowing flow of said lubricant therebetween, whereby once said lubricant is introduced into said first passageway means said lubricant is caused to lubricate said upper bearing race means and subsequently to migrate to said lower bearing race means and means sealing an upper end of the housing and defining a space above the upper bearing race, and wherein said first passageway communicates with said space above the upper bearing race whereby the lubricant flows from said space downwardly through the upper bearing race.

15. The lawn mower defined in claim 14 wherein said means sealing said upper end of the housing includes a closure member located about said shaft and engageable with said flange means and wherein there is further included a closure member engageable with the housing below the lower bearing race means for sealing the lower end of said housing.

16. The lawn mower defined in claim 15 wherein said housing has upper and lower recesses respectively receiving the upper and lower bearing race means.

17. The lawn mower defined in claim 14 wherein said means for introducing lubricant into said bearing housing assembly is disposed below said flange means.

18. The lawn mower defined in claim 14 wherein said means for introducing lubricant into said bearing assembly housing is disposed above said flange means.

* * * * *